(12) United States Patent
Milan et al.

(10) Patent No.: US 6,835,043 B2
(45) Date of Patent: Dec. 28, 2004

(54) HYDRAULIC TURBINE FEED TANK

(75) Inventors: Daniel C Milan, Bresson (FR); Fabrice R Loiseau, Echirolles (FR)

(73) Assignee: Alstom Power N.V., Amsterdam (NL)

( * ) Notice: Subject to any disclaimer, the term of this patent is extended or adjusted under 35 U.S.C. 154(b) by 44 days.

(21) Appl. No.: 10/312,690

(22) PCT Filed: Jul. 11, 2001

(86) PCT No.: PCT/FR01/02247
§ 371 (c)(1),
(2), (4) Date: Dec. 30, 2002

(87) PCT Pub. No.: WO02/04808
PCT Pub. Date: Jan. 17, 2002

(65) Prior Publication Data
US 2003/0223857 A1 Dec. 4, 2003

(30) Foreign Application Priority Data
Jul. 12, 2000 (FR) .............................. 00 09138

(51) Int. Cl.[7] .............................. F03B 15/06
(52) U.S. Cl. .............................. 415/8; 415/73; 415/184; 415/906; 415/908
(58) Field of Search .............................. 415/2.1, 3.1, 4.5, 415/8, 71, 72, 73, 182.1, 184, 203, 205, 905, 906, 908

(56) References Cited

U.S. PATENT DOCUMENTS 4,465,430 A * 8/1984 De Montmorency ........ 415/205
5,167,483 A  12/1992 Gardiner .................... 415/3.1

FOREIGN PATENT DOCUMENTS

DE              747919        10/1944

* cited by examiner

Primary Examiner—Edward K. Look
Assistant Examiner—Dwayne White
(74) Attorney, Agent, or Firm—Dowell & Dowell, P.C.

(57) ABSTRACT

An installation comprising a turbine equipped with a wheel rotatable about an axis (X-X'), and a tank feeding the turbine. The feed tank having, projecting on a plane globally perpendicular to the axis (X-X'), an external spiral shape. The feed tank forms a helico-convergent duct centered on the axis (X-X') and convergent towards the turbine. The duct is bordered by an outer partition, an inner partition and at least an intermediate partition contributing to the reinforcement of the tank.

11 Claims, 6 Drawing Sheets

HYDRAULIC TURBINE FEED TANK

BACKGROUND OF THE INVENTION

1. Field of the Invention

The invention relates to an installation for recovery or conversion of hydraulic energy into another energy.

2. Brief Description of the Related Art

In the domain of energy conversion, in particular in the domain of the production of electrical energy from a waterfall, it is known to use a vertical - or horizontal-axis turbine of which the blades are disposed on the path of flow of the water in order to drive an apparatus, such as an alternator, in rotation. The adaptation of the energetic yield of the installation with respect to the flow of water which traverses it is generally controlled in order to obtain a constant speed of rotation of the shaft of the turbine hub, this making it possible to cause the alternator to function at stabilized exit speed and frequency. Such a servo-control of the functioning of the turbine is obtained by adjusting the orientation of flaps for admission of the water flow in the distributor of the turbine, such flaps being most often called "guide vanes", and possibly by adjusting the orientation of the blades of the turbine about their pivot journals on its hub.

It is therefore necessary to use servo-motors for controlling the orientation of the guide vanes and the blades with respect to their respective pivot axes. This imposes the production of a gating ring whose diameter may be considerable.

French Patent 723 297 discloses a turbine of which the feed tank, free of guide vanes, has a spiral envelope, narrowing to form an anti-chamber for the rotor of a turbine. This spiral envelope or tank makes it possible to obtain a homogeneous circumferential feed of the turbine and to do without the use of guide vanes, which substantially simplifies the installation. However, the shape of this known tank is such that, in the event of considerable pressure prevailing therein, the tank or envelope tends to be deformed in a direction substantially parallel to the axis of rotation of the turbine. In practice, this deformation is such that the use of the turbines of this type has been limited to short falls, less than 2 meters.

Furthermore, in the known technique, the installations including a horizontal-axis turbine generally comprise a bulb in which are installed the alternator and its annexed equipment, this bulb being completely bathed by the water feed flow of the turbine. Such a bulb constitutes a confined space in which the implantation of the apparatus is relatively delicate and an access to this bulb should be provided for the operators and for the transmission of the electrical power and the information concerning the functioning of the installation, which, there again, imposes considerable servitudes.

SUMMARY OF THE INVENTION

It is a more particular object of the invention to overcome these drawbacks by proposing an installation for conversion of hydraulic energy not necessitating the use of distributors or of guide vanes, while presenting a mechanical resistance which is substantially increased with respect to the known turbines of the state of the art. Another object of the invention is to provide an installation in which the accessibility to the alternator and to its peripheral equipment is improved with respect to the installations comprising a bulb.

In this spirit, the invention concerns an installation for conversion of hydraulic energy into another energy, comprising a turbine, equipped with a wheel which rotates about an axis, and a tank feeding this turbine. The tank having, projecting on a plane globally perpendicular to this axis, an external spiral shape which forms a helico-convergent duct centered on this axis and convergent towards the turbine.

Helico-convergent is understood to mean that the duct is substantially in the form of a helix about the axis of rotation of the turbine, its outer envelope being convergent in the direction of this axis in the direction of flow, the transverse section of the tank reducing on the surface and approaching the axis in the afore-mentioned direction of flow.

Thanks to the helico-convergent nature of the duct formed by the tank, the duct extends both in a dimension parallel to the axis of rotation of the turbine and in a direction perpendicular to this axis, where it has an external, substantially spiral shape, which makes it possible to shape the flow of water in optimal manner in order to obtain a regular distribution of the flow of water at the blades of the turbine. The helico-convergent shape is such that the pressure prevailing in the tank is absorbed by walls thereof which extend, at least partly, parallel to the axis of rotation of the turbine and partly perpendicularly to this axis, being firmly connected to the other walls, with the result that they can absorb the forces of internal pressure of the duct without deformation.

According to advantageous but non-obligatory aspects of the invention, the installation incorporates one or more of the following characteristics:

the tank comprises a water admission part, for example of substantially rectilinear shape, of which a median axis forms an acute angle, preferably of the order of 45°, with the axis of rotation of the turbine. This inclined orientation of the water admission with respect to the axis of the turbine makes it possible to obtain both an axial acceleration and a centrifugal acceleration of the flow of water inside the tank, the centrifugal acceleration being countered by the reaction due to the outer partition of the tank.

The tank comprises an outer partition and an inner partition connected by at least one intermediate partition forming a lateral wall of the duct. These outer and inner partitions and this intermediate partition are firmly connected together, for example by welding in the case of partitions made of metal sheets, with the result that they efficiently oppose the radial forces resulting from the pressure prevailing inside the tank. In that case, the outer edge of the intermediate partition may be helico-convergent, centered on the axis of rotation and convergent in the direction of the opening of the duct formed around the turbine. Likewise in that case, two intermediate partitions may be provided, of which one constitutes an inner rib of the duct, the duct comprising two portions made between its outer and inner partitions, on either side of the inner rib. This inner rib therefore makes it possible to reinforce the rigidity of the tank further.

the tank forms, around the axis of rotation of the turbine, a volume accessible from outside the tank in a radial direction and surrounded by the duct. This volume makes it possible to house the shaft of the turbine and an alternator while it is easily accessible without having to traverse the duct, i.e. the flow of supply water of the turbine. The improved accessibility allows a better implantion of the alternator and facilitates the exploitation of the installation. This volume is advantageously bordered by the inner partition of the duct, this duct being inscribed in a cylinder with circular base coaxial to the axis of rotation of the turbine, at the level of a first part of this axis, and substantially truncated at the level of a second part of this axis.

the tank is formed by assembling metal sheets shaped as controlled surfaces. The tank of the invention may thus be manufactured by assembling surfaces that may be obtained by conventional operations of manufacture.

the tank comprises an outer partition substantially parallel to the axis of rotation of the turbine and defined between an upstream edge and a downstream edge, these edges having a helico-convergent shape centred on this axis, this outer partition being connected, at the level of its downstream edge, to a substantially truncated partition centred on the axis of rotation and of which a free edge, opposite the afore-mentioned downstream edge, surrounds or is adjacent to the opening of the duct, the afore-mentioned truncated surface being convergent in the direction of this free edge.

BRIEF DESCRIPTION OF THE DRAWINGS

The invention will be more readily understood and other advantages thereof will appear more clearly in the light of the following description of a form of embodiment of an installation in accordance with its principle, given solely by way of example and made with reference to the accompanying drawings, in which.

Figure 1:
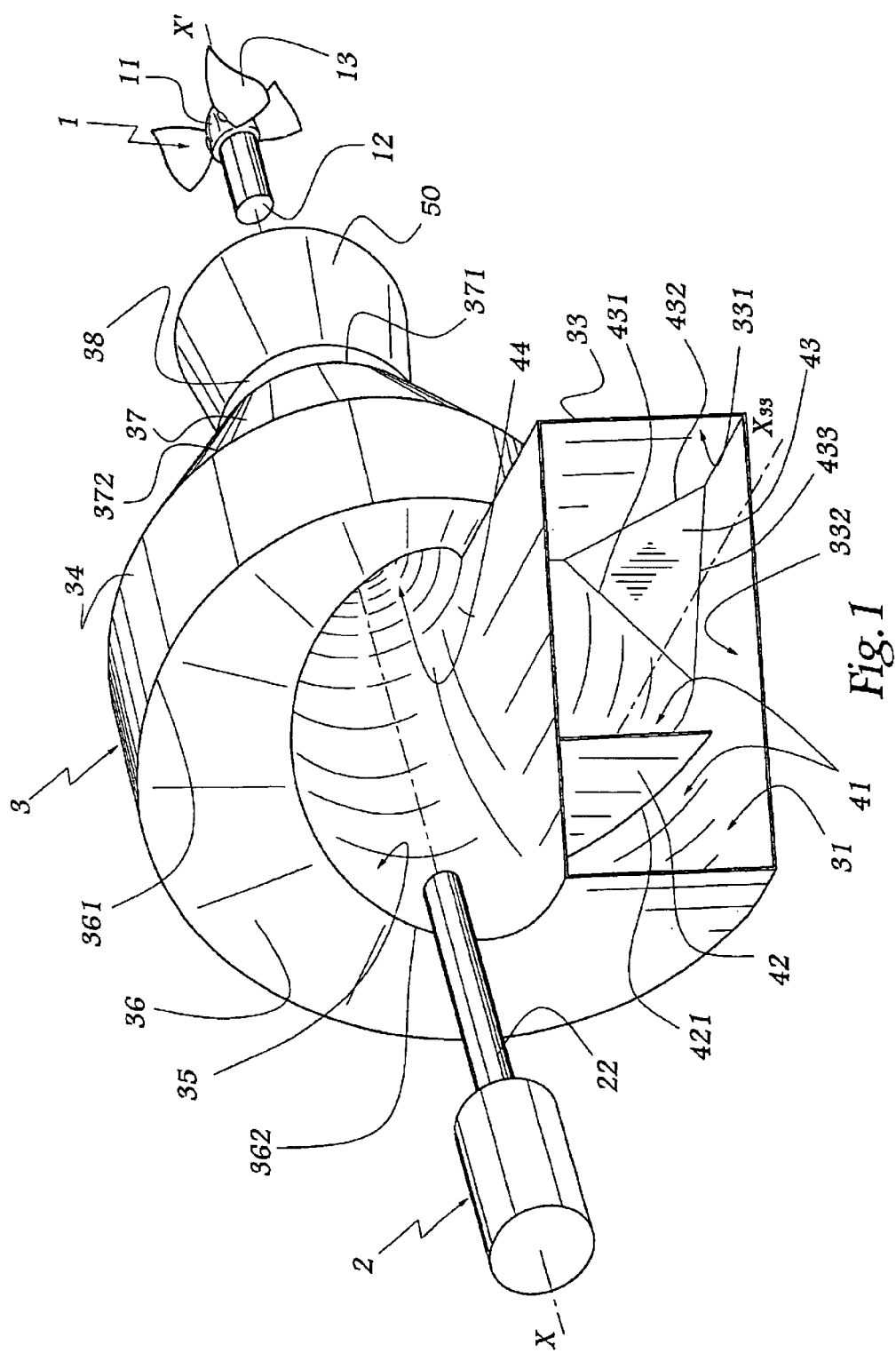
FIG. 1 schematically shows, in exploded perspective, an installation according to the invention.

The installation shown in the Figures includes a turbine 1 comprising a hub 11 fast with a shaft 12 and equipped with four blades 13. This turbine 1 is provided to be disposed so as to rotate about a substantially horizontal axis X-X'. The turbine may be either of Francis type with fine vanes, or of Kaplan type with blades each mobile about a journal, or of helix type with fine blades, or more generally of any other type compatible with the invention. In the case of a turbine with blades each mobile in rotation about a journal perpendicular to the axis of the turbine, the spiral paths of the flow between the two cones upstream of the wheel develop as a function of the point of functioning and are adapted to the angular position of the blades.

An alternator 2 is provided to be associated with the turbine 1 likewise being centred on axis X-X', an input shaft 22 of the alternator 2 being provided to be coupled with the shaft 12 of the turbine 1.

The installation also comprises a tank 3 defined between an inlet opening or section 31 for admission of water coming from a barrage upstream and an opening or output section 32, made around the blades 13, i.e. at the level of the wheel or rotor of the turbine 1. This tank 2 is connected, at opening 32, to a cone 50 of an aspirator or divergent.

The tank 3 comprises a part 33 for admission of water, from the opening 31 up to the level of axis X-X', this part 33 being substantially rectilinear and with substantially constant internal section, of rectangular shape similar to the shape of the opening 31. $X_{33}$ denotes the median axis of the part 33 and $F_{33}$ the direction of flow of the water along axis $X_{33}$. F denotes an arrow representative of the direction of flow of the water towards the opening 32 along axis X-X'. The arrows F and $F_{33}$ are convergent, in that the projection of arrow $F_{33}$ on axis X-X' is oriented in the same direction as the arrow F and the angle $\alpha$ defined between these two arrows, i.e. between axes X-X' and $X_{33}$, is an acute angle having a value of the order of 45°.

Figure 5:
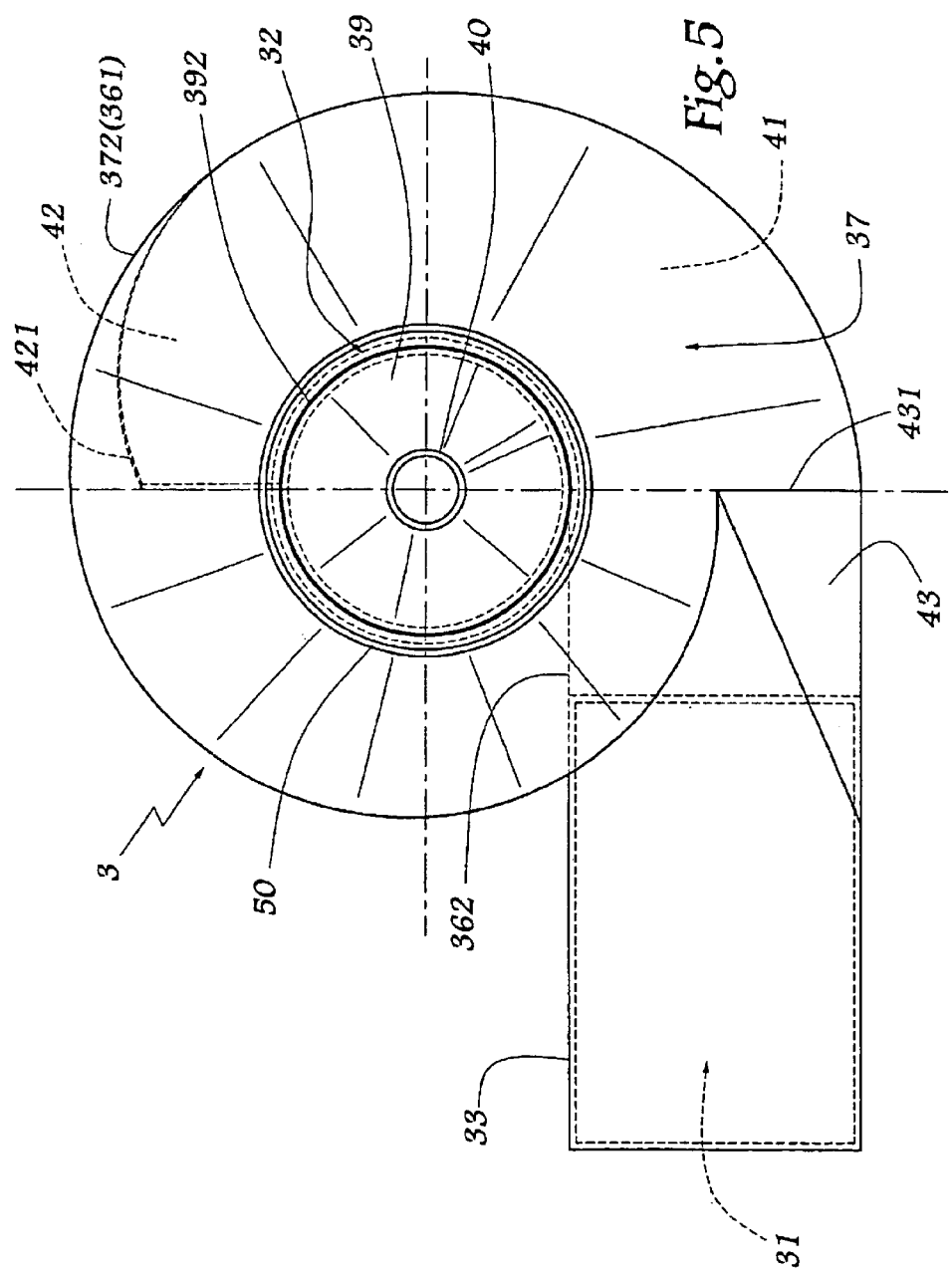
FIG. 5 is an end view of the tank of the installation of FIGS. 1 to 4, seen downstream.
Figure 6:
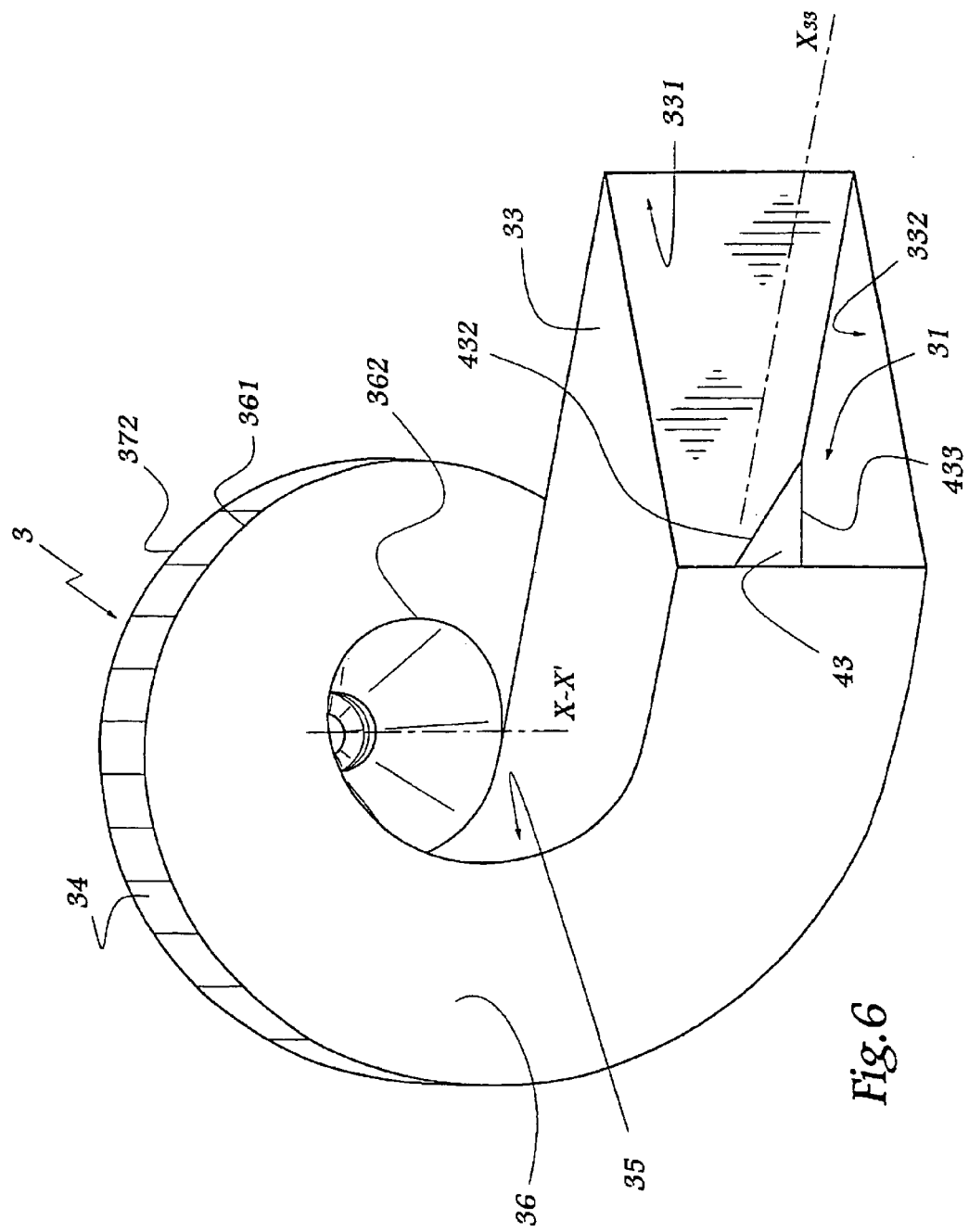
FIG. 6 is a view in perspective of the tank of FIG. 5, seen upstream.

Downstream of part 33, the tank 3 comprises an outer partition 34 of which the projection in a plane perpendicular to axis X-X', for example in the plane of FIG. 5, is a spiral.

Downstream of part 33, the tank 3 also comprises an inner partition 35 of which the projection in a plane perpendicular to axis X-X' is circular.

On the upstream side of the tank 3, the surfaces 34 and 35 are connected by an intermediate partition 36. A joint 361 is shown between the surfaces 34 and 36 and joint 362 between the surfaces 35 and 36.

Opposite the surface 36, the partition 34 is connected with a substantially truncated partition 37 converging downstream in the direction of the hub 11 of the turbine 1. A ring 38 is provided at a downstream edge 371 of the partition 37, around the hub 11 and the blades 13. The inner partition 35 extends, on the downstream side, by a substantially truncated partition 39 likewise converging downstream and centered on the axis X-X', extending, at its downstream edge 391, by a ring 40 surrounding the shaft 12.

An O-ring is provided between the ring 40 and the shaft 12 in order to isolate the volume defined around the hub 11 from the inner volume of the partitions 35 and 39.

Taking the foregoing into account, there is formed inside the tank 3 a helico-convergent duct 41 in that it comprises, at the level of the part of the tank surrounded by the surface 34, a first section in the form of a spiral helix convergent in the direction of axis X-X', and, downstream of this first section, a second truncated section convergent in the direction of the hub 11 of the turbine 1, inside the partition 37.

The opening 32 of the duct 41 is annular, as it is formed between the rings 38 and 40 which are concentric.

The geometry of the tank 3 is such that the pressure of the flow of water transiting through the duct 41 exerts on the elements constituting the tank an effort of expansion which is easily absorbed by the partitions 34 to 37 and 39 which are contiguous along the edges 361 and 362 and along an edge 372, between the partitions 37 and 34 and along another edge 392, between the partitions 39 and 35. This taking up of effort therefore avoids a deformation of the tank 3 under the effect of a considerable pressure of the water in the course of flow, which constitutes substantial progress with respect to the state of the art known from FR-A-723 297. In particular, the partition 36 maintains the distance between the partitions 34 and 36 at a predetermined value.

In addition, a second intermediate partition 42 is formed inside the duct 41 and connects the inner faces of the partitions 34 and 35, along two joints respectively referenced 421 and 422. The This partition 42 also contributes to the dimensional stability of the tank 3, in particular by opposing a radial expansion thereof in a sense of spacing the partitions 34 and 35 to which it is welded, like partition 36.

The partition 42 constitutes an inner rib of the duct 41, the duct comprising two portions, made on either side of this partition 42, for which the partition 42 forms a lateral partition.

An inclined partition 43, for example triangular and planar, is disposed in the zone of join between the part 33 and the partition 37 and constitutes a surface of transition between the part 33 and the part of the duct 41 defined inside the partition 37. This transition surface makes it possible to give the flow of water in its vicinity a centripetal component with respect to axis X-X'. A joint 431 is shown between the partitions 43 and 37. A joint 432 is also shown between the partition 43 and a side 331 of the part 33. A further joint 433 is shown between the partition 43 and the bottom 332 of the part 33. The partition 43 might have a non-triangular shape and be skew.

The edges 361, 372 and 421 are helico-convergent and, seen in end view, are spiral in shape. In addition, the partition 37 is not strictly truncated since its edge constituted by the edge 372 is not circular. However, this partition is substantially truncated in that it is convergent about axis X-X' in the direction of the wheel of the turbine 1.

The edge 362 is in the form of a circular helix centered on axis X-X', which corresponds to the fact that the partition 35 is inscribed in a cylinder.

Figure 2:
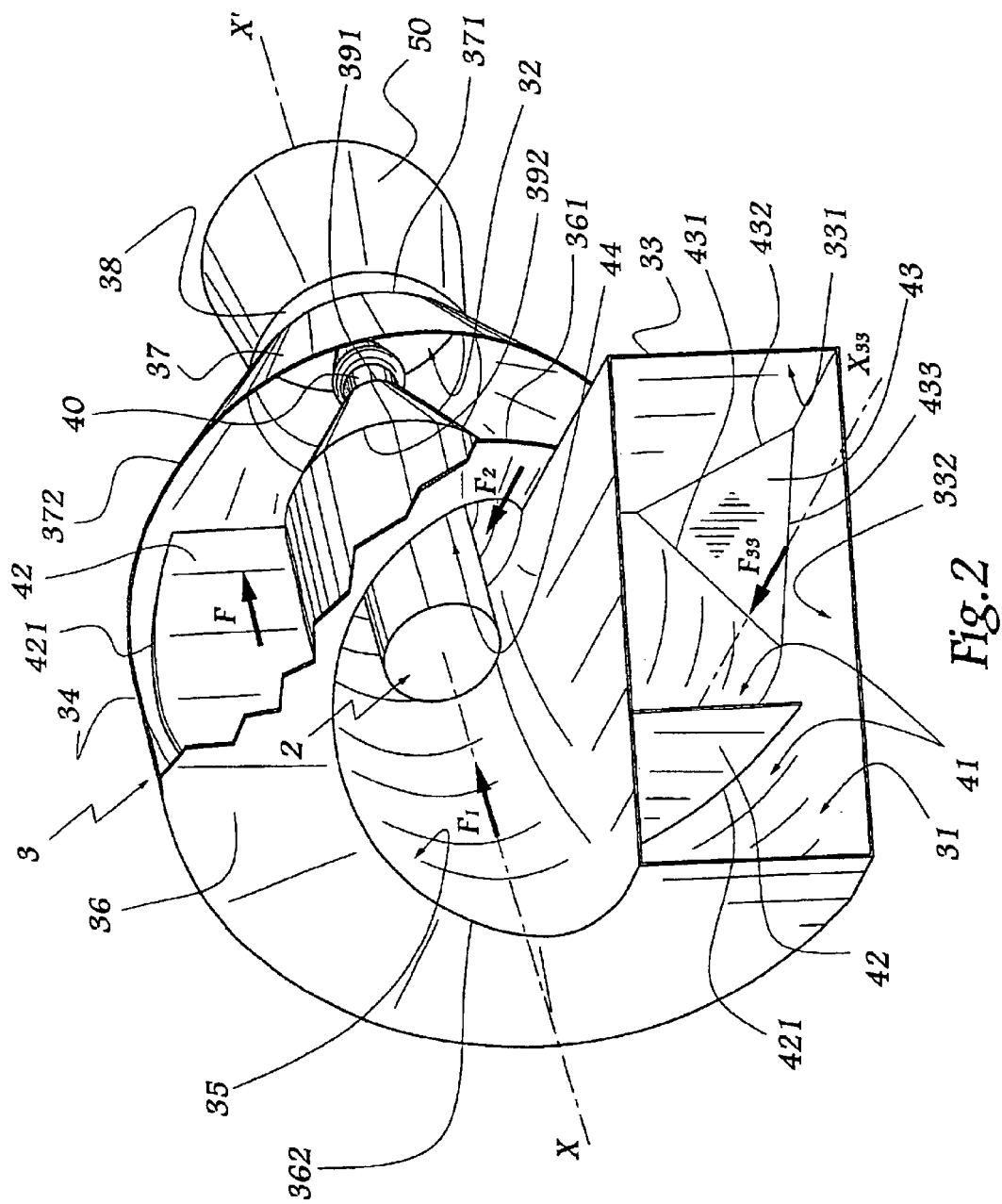
FIG. 2 is a view in perspective with parts torn away of the installation of FIG. 1 in operational configuration.
Figure 3:
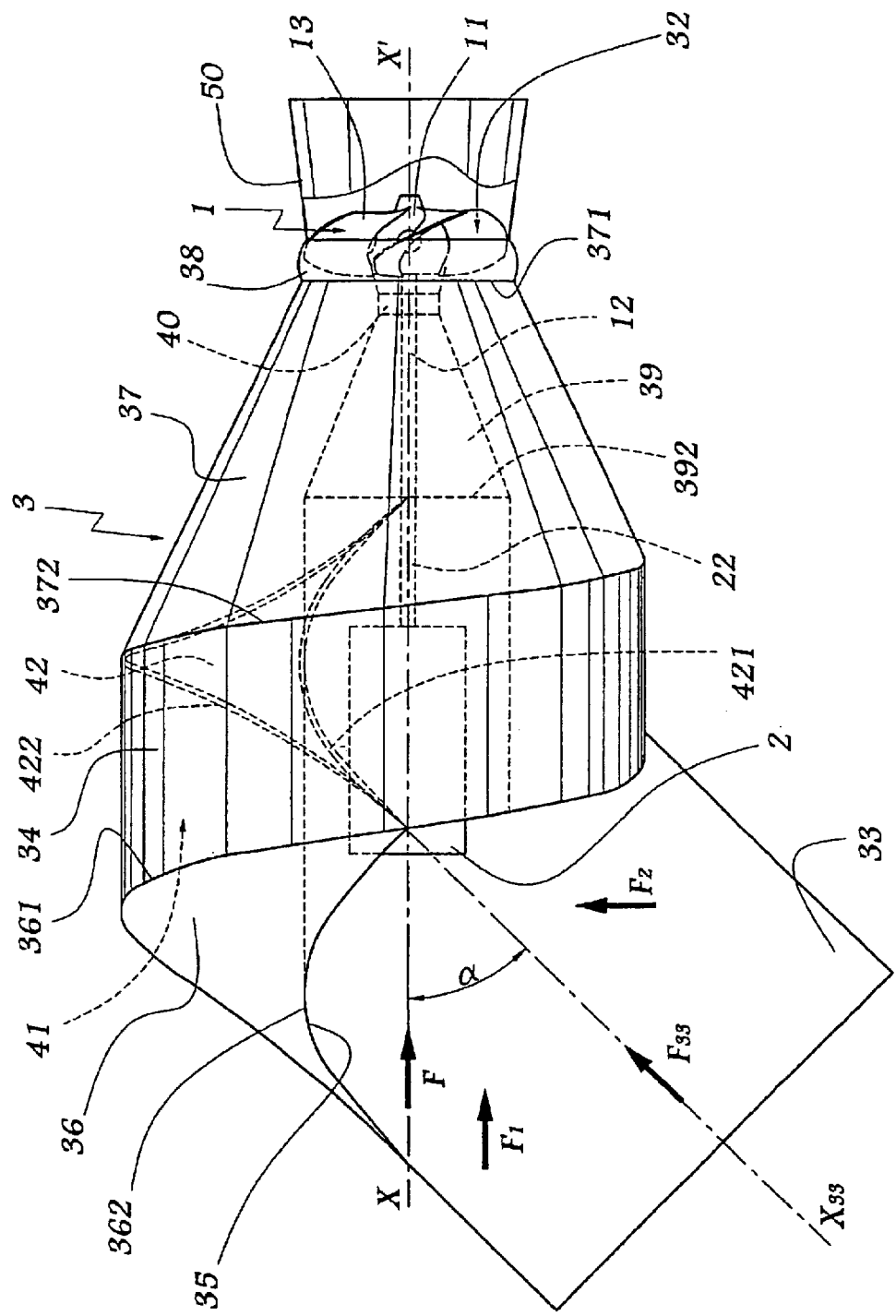
FIG. 3 is a plan view of the installation of FIGS. 1 and 2.
Figure 4:
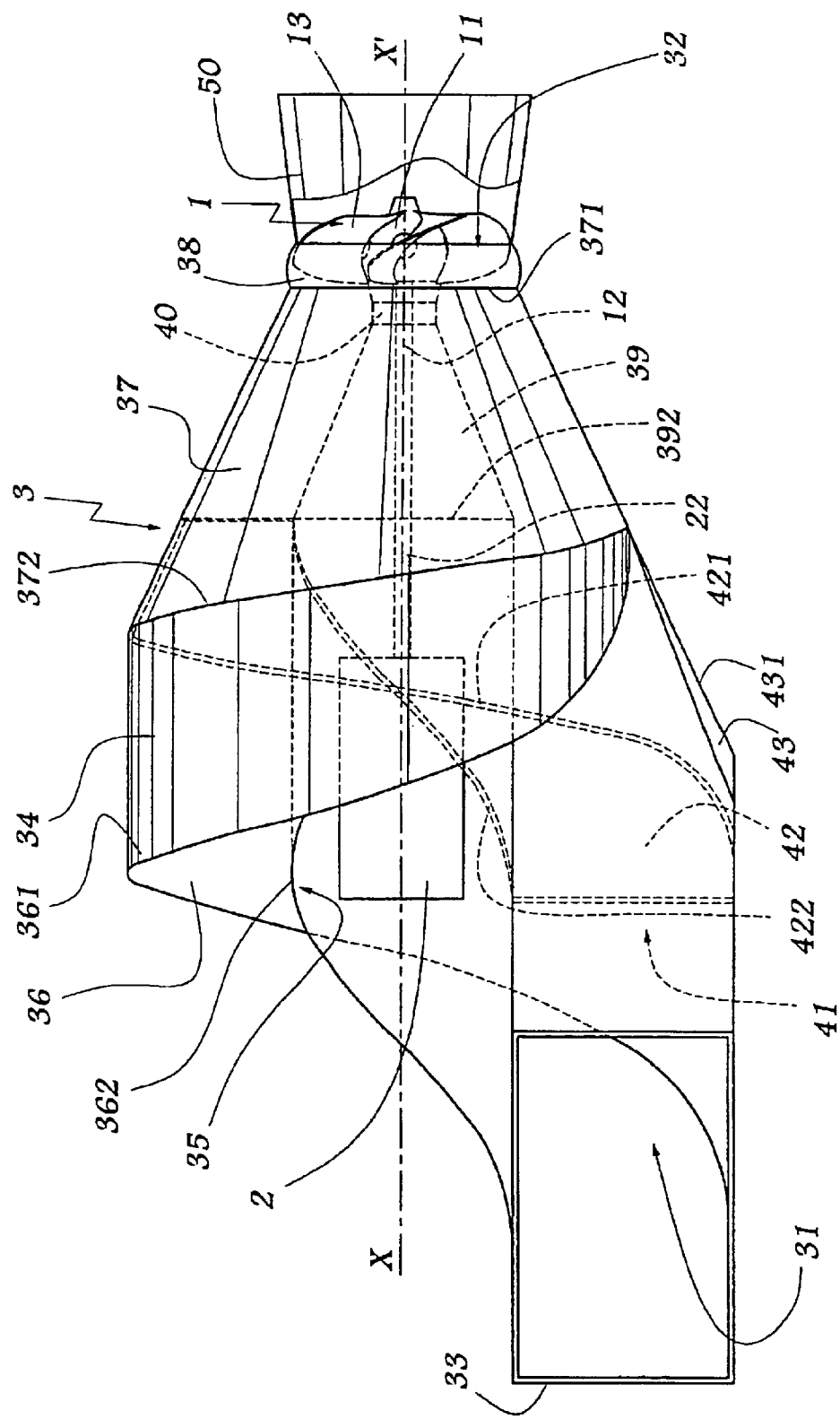
FIG. 4 is a side view of the installation of FIGS. 1 to 3.

Taking into account the geometry of the tank 3, there is formed a volume 44, defined by the partitions 35 and 39, which is made around the axis X-X' while being isolated from the duct 41. This volume 44 is accessible both in an axial direction as represented by arrow $F_1$ and in a radial direction as represented by arrow $F_2$ in FIGS. 2 and 3.

It is not necessary to traverse the duct 41 to access, in the directions of arrows $F_1$ and $F_2$, the volume 44 in which are disposed, in configuration of use of the installation, the alternator 2 and its monitoring or control equipment, which are not shown. This therefore results in an easy positioning of the alternator and exploitation, both concerning the transmission of the electric current generated by this alternator and concerning its monitoring and the necessary maintenance operations. In particular, the operators do not have to move and transport material in narrow ducts which are difficult to access.

According to a particularly advantageous aspect of the invention, the partitions 34 to 37 and 39 as well as the part 33 are formed by assembling metal sheets shaped as controlled surfaces. This assembly may be effected by welding, bolting or any other method, while the use of controlled surfaces makes it possible to envisage manufacture thereof on conventional machines, such as bending presses. In particular, the different partitions may be made by assembling planar plates, the spiral, helical or other shapes in that case being obtained approximately. The cost price of the tank 3 may thus be efficiently controlled.

The divergent 50 is fast with the tank 3, downstream of the turbine 1 and constitutes the first part of an aspirator or "divergent" which opens out in the downstream barrage of the installation.

The invention has been described with an installation of substantially horizontal axis of rotation. However, it is applicable independently of the orientation of this axis which may be vertical or inclined. Similarly, the admission part 33 of the tank may be oriented in a substantially horizontal direction as shown in the Figures, in a substantially vertical direction or in a direction inclined both with respect to the horizontal and to the vertical. In practice, the tank 3 may be disposed in different configurations about an axis X-X' whose orientation varies as a function of the configuration of the fall in order to simplify the civil engineering works.

What is claimed is:

1. Installation for conversion of hydraulic energy into another energy, comprising; a turbine (1), equipped with a rotor (11, 13) rotatable about an axis (X-X'), and a tank (3) feeding said turbine, said tank having, projecting on a plane globally perpendicular to said axis, an external spiral shape (34, 361, 372), such that said tank forms a helico-convergent duct (41) centered on said axis and which is convergent inwardly toward said axis from an inlet opening (31) towards said turbine.

2. Installation according to claim 1, wherein a median axis ($X_{33}$) of said inlet opening (31) forms an acute angle ($\alpha$) with said axis (X-X') of said turbine.

3. Installation according to claim 1 wherein said tank includes an outer partition (34) and an inner partition (35) connected by at least one intermediate partition (36, 42) forming a lateral wall of said duct (41).

4. Installation according to claim 3, wherein an outer edge (361, 421) of said at least one intermediate partition (36, 42) is helico-convergent, centered on said axis (X-X') and convergent towards an outlet opening (32) of said duct (41) formed around said turbine (1).

5. Installation according to claim 4 including two intermediate partitions (36, 42) of which one constitutes an inner rib (42) of said duct (41), said duct including two portions made between said outer partition (34) and said inner partition (35) on either side of said inner rib.

6. Installation according to claim 1 wherein said duct (41) forms, around said axis (X-X'), a volume (44) accessible from outside said tank in a radial direction ($F_2$) and which volume is surrounded by said duct.

7. Installation according to claim 6, wherein said volume (44) is bordered by an inner partition (35) of said duct, said partition (35) being inscribed in a cylinder with circular base coaxial to said axis (X-X') a first part of said axis and substantially truncated (39) at a second part of said axis.

8. Installation according to claim 6 wherein an apparatus (2) for transforming mechanical energy from a driven shaft (12) of said turbine (1) into another energy is positioned in said volume (44).

9. Installation according to claim 1 wherein said tank (3) is formed of sheet metal.

10. Installation according to claim 1 wherein said tank (3) includes an outer partition (34) substantially parallel to said axis (X-X') and defined between an upstream edge (361) and a downstream edge (372), said edges having a helico-convergent shape centered on said axis (X-X'), said outer partition being connected, at said downstream edge, to a substantially truncated partition (37) centered on said axis and of which a free edge (371) opposite said downstream edge (372) is adjacent to an outlet opening (32) of said duct (41), and said truncated surface being convergent towards said free edge.

11. The installation of claim 2 wherein said acute angle ($\alpha$) is approximately 45°.

* * * * *